R. M. CRAIG.
APPARATUS FOR PROJECTING MOTION PICTURES.
APPLICATION FILED AUG. 20, 1913.

1,247,646.

Patented Nov. 27, 1917.
6 SHEETS—SHEET 5.

Inventor
R. M. Craig

Witnesses

By
Attorneys

R. M. CRAIG.
APPARATUS FOR PROJECTING MOTION PICTURES.
APPLICATION FILED AUG. 20, 1913.

1,247,646.

Patented Nov. 27, 1917.
6 SHEETS—SHEET 6.

UNITED STATES PATENT OFFICE.

RICHARD M. CRAIG, OF SAN ANTONIO, TEXAS.

APPARATUS FOR PROJECTING MOTION-PICTURES.

1,247,646.    Specification of Letters Patent.   Patented Nov. 27, 1917.

Application filed August 20, 1913. Serial No. 785,750.

*To all whom it may concern:*

Be it known that I, RICHARD M. CRAIG, citizen of the United States, residing at San Antonio, in the county of Bexar and State of Texas, have invented certain new and useful Improvements in Apparatus for Projecting Motion-Pictures, of which the following is a specification.

This invention relates to apparatus for the projection of motion pictures.

One object of the invention is the provision of means whereby the operating speed of the projecting machine may be lowered from one-fourth to one-half of the speed at present required and at the same time lessen very considerably the amount of film now necessary for reproducing moving pictures in natural colors.

One of the principal objects of my invention is to provide a simple means for eliminating the usual flicker, and this result depends primarily on two principles, first in using two or more loops with their usual intermittent motion mechanisms for intermittently moving the film immediately above the loop, the loops being formed alternately so that while one picture is projected through the film gate opposite one loop, the next picture is coming into place in front of the film gate of the second loop, and while it is showing through the film gate and lens opposite that loop, the next picture is coming into place in the first named loop and so on, this being repeated indefinitely. The mechanism for securing intermittent motion of the film with relation to the two loops is so arranged that while one intermittent film shifting mechanism is standing still and steady, the other is in motion, and vice versa.

The second principle upon which my invention is based is the use of a film on which the pictures are disposed not in consecutive order as they are at present but in such order that one loop will present certain picture spaces to the projecting lens of that loop and the other loop will only present a certain other set of pictures to the second projecting lens, the pictures being taken in the same order in which they are projected.

While the mechanical means whereby the objects before referred to are attained is of relatively small moment, yet in the accompanying drawings I have illustrated a construction of camera and several different forms of projecting apparatus adapted to be used in accordance with the principles set forth in this specification.

In the accompanying drawings.

Corresponding and like parts are referred to in the following description and indicated in all the views of the accompanying drawings by the same reference characters.

Figures 1, 2, 3, 4:
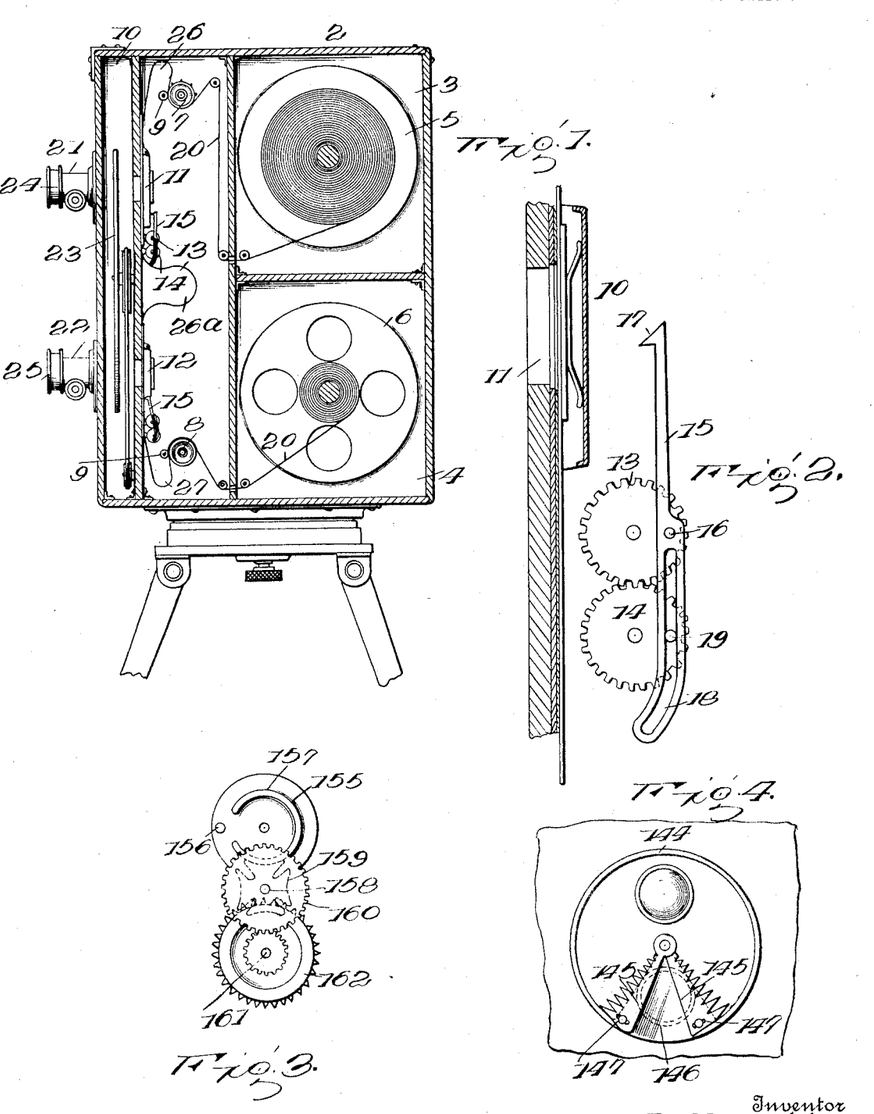
Figure 1 is a vertical section through a moving picture camera constructed in accordance with my invention.
Fig. 2 is a detail fragmentary view of an ordinary means for intermittently shifting the film across the film gate.
Fig. 3 is a detail side elevation of means for communicating an intermittent motion to a film sprocket, this construction being capable of being used in place of the intermittent motion illustrated in Fig. 2.
Fig. 4 is a face view of a shutter adapted to be used with either the camera or the projecting apparatus.

The camera whereby moving pictures may be taken according to my system is illustrated in Fig. 1. The camera is of ordinary form and includes a case 2 of any suitable construction and having an upper film compartment 3 and a lower film compartment 4 or magazine, the compartment 4 being the rewind magazine.

Mounted in the compartment 3 is the reel 5 and in the compartment 4 is the rewind reel 6. The sprocket wheel 7 supplies the film steadily to the mechanism for intermittently moving the film, and the sprocket 8 is for the purpose of steadily supplying the film to the rewind reel. 9 are the usual jockey rollers. 10 is a housing disposed in the front portion of the camera and 11 and 12 are upper and lower film gates. Inclosed in the housing 10 and operating in front of the film gates 11 and 12 is any usual mechanism for securing an intermittent movement to the film. An ordinary claw movement such as illustrated in Fig. 2 is shown in Fig. 1 for the purpose of moving the film. This claw movement or any other suitable intermittent movement is of double the usual size so as to advance the film two pictures with each actuation of the claw movement. The claw movement illustrated is of any suitable form but is shown as including the two intermeshing wheels 13 and 14 and the claw 15 which is pivoted at 16 upon the wheel 13 and which is formed with a tooth 17 at one end and is longitudinally slotted as at 18 for the accommodation of a pin 19 which projects from the face of the wheel 14. By using these two wheels 13 and 14 and mounting the claw 15 thereon, the claw 15 is given a parallel reciprocating movement as will be thoroughly understood by those conversant with the art.

It will be observed that there are two gates 11 and 12 past which the film 20 passes, and that opposite these gates are the lens boxes 21 and 22. A shutter 23 of any ordinary construction is disposed within the compartment or housing 10 and passes the front of the lens boxes 21 and 22. This shutter may be a single shutter passing before both of the lenses 21 and 22 alternately exposing one and then the other, or there may be two separate shutters operating in harmony. The claw movements as previously stated operate alternately, that is, while one of the claws 15 is moving upward the other claw is moving downward. Permanent red and green color filters or screens 24 and 25 may be placed in front of the lenses 21 and 22 or they may be put on the lenses in the form of a cap as indicated in Fig. 1, these caps permitting the removal of the color screens so that negatives may be produced for ordinary black and white pictures, or natural color pictures may be taken according to whether the screens are on or off.

It will be particularly noted that in the camera illustrated in Fig. 1 there are three "loops" in the film, the loop 26 above the gate 11, the loop 27 below the gate 12 and the intermediate loop 26$^a$. The first loop 26 coöperates with the gate 11 while the second loop coöperates with the gate 12. While one picture is being projected through the loop opposite one gate, the next picture is coming into before the second film gate, this being repeated indefinitely.

Figure 16:
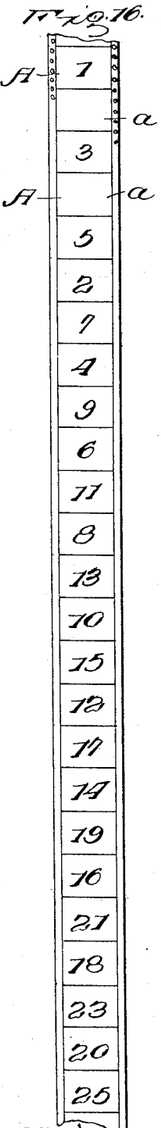
Figs. 16, 17, 18, 19, 20, 21 and 22 are diagrammatic face views of portions of the film illustrating the arrangement of pictures thereon.

In order to secure a complete understanding of the action of the camera in taking the picture, reference must be made to Fig. 16. In Fig. 16 is shown a length of film with a series of motion pictures thereon, each picture being numbered. It will be noted from Fig. 16 that the beginning of the film A has the picture 1, then a blank space $a$, then the picture 3 or third picture of the series of pictures, then a blank space $a'$, then the picture 5, then the picture 2, that is, the second picture of the series, followed by the picture 7, which in turn is followed by the picture 4, and so on. The successive pictures, therefore, 1, 2, 3 and 4, it will be seen do not follow each other in consecutive order as they do in the ordinary picture film but consecutive or successive pictures are spaced from each other a definite distance or a definite number of picture spaces. Thus the number 1 picture is spaced from number 2 picture a distance of four picture spaces, and the picture number 3 is spaced from picture number 4 a distance of four spaces, and picture number 5 is spaced from picture number 6 a distance of four spaces, the picture 7 being disposed next preceding picture number 4 and the picture number 9 being disposed next preceding number 6 and so on down the film.

The blank spaces $a$ disposed between the picture 1 and the picture 3 and between 3 and 5 are necessary at the beginning of the film but are not necessary after the film has commenced to move a sufficient distance to bring the proper picture opposite the lowermost lens box or gate.

In the beginning the film is threaded in such a manner that after the first intermittent sprocket is threaded, a predetermined number of sprocket holes is counted along the film sufficient to allow for another loop and yet stop on a space for a picture that will be odd to the space in contact with the intermittent sprocket above, and then the tooth of the proper intermittent sprocket is inserted in its proper sprocket hole in the film.

To illustrate; supposing that the film is in the position on the intermittent feed mechanism of the film gate 11, then forty sprocket holes are counted along the film or ten pictures, presuming that the film is the Edison standard gage film, these sprocket holes being counted from the middle outward tooth of one sprocket to the middle outward tooth of the second sprocket. There would be, therefore, a space of ten pictures between the upper and lower gates. The first picture to be presented will be an odd picture and the tenth picture an even picture, and after being threaded thus the two intermittent sprockets will each continue to feed odd and even spaces only. While I have stated the pictures to be alternately displayed as being separated from each other a distance of ten spaces, I wish it understood that I do not need to be limited to any special number of pictures or sprocket holes between the loops as my mechanism will work with any number. The least possible number, however, is desirable.

The first loop, that is, for instance in Fig. 1 the loop 26, handles the even pictures and after display its intermittent sprocket advances the film two pictures (eight sprocket holes, Edison standard gage) instead of one picture or four holes as at present. Thus the next picture space for its use in projection would still be an even picture. In like manner, the second loop, as for instance the loop 13 in Fig. 1, uses only the odd picture spaces and after using one it moves up two spaces of film (thus skipping the odd picture space) and its next space for use is still an odd space. In this manner an odd and an even picture space are never presented through the same gate, each having its separate gate, neither one ever interfering with the other, and the same picture is never shown twice.

Figure 17:
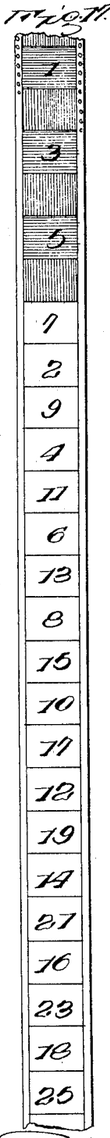
Figure 18:
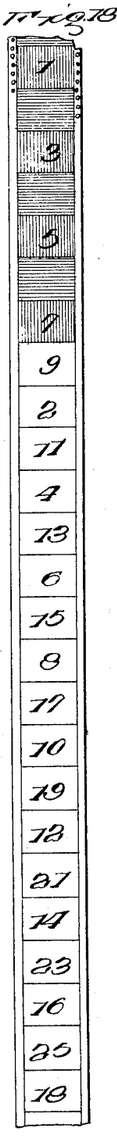

It is necessary to standardize this system and to determine upon some definite distance between the pictures 1 and 2 so that any picture taken in any camera with this method will match or correspond to any projecting machine operating on this plan so that its operator may always know in advance how many spaces to skip or allow for the loops in threading the machine. Fig. 16 illustrates the distance between the two intermittent motions including the loops as being six pictures. In Fig. 17 there are eight picture spaces separating consecutive pictures, and in Fig. 18 there are ten picture spaces. Figs. 17 and 18 illustrate the arrangement of picture spaces on films for color photography and will be later referred to. The matter of the arrangement of these picture spaces upon the film will also be later referred to, it being merely necessary at this time to indicate the operation of the film in connection with the camera shown in Fig. 1.

Figures 5, 6, 23, 24, 24A, 25:
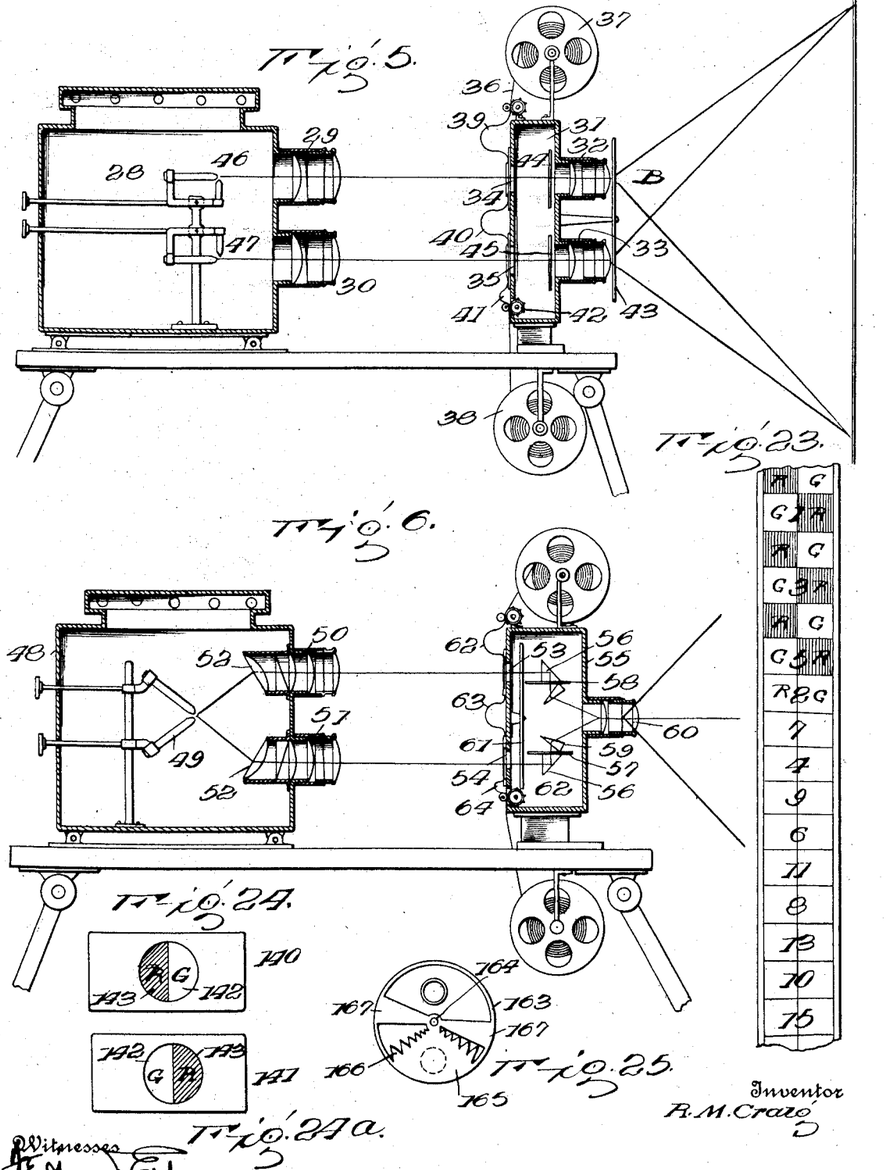
Fig. 5 is a vertical section through a projecting apparatus adapted to be used with my film.
Fig. 6 is a similar section through another form of projecting apparatus.
Fig. 23 is a face view of another form of motion picture film particularly adapted for projecting color pictures.
Figs. 24 and 24ª are face views of the color slides or screens adapted to be used with the film shown in Fig. 23.
Fig. 25 is a view of a modified form of shutter.

A number of different mechanisms may be used for projecting pictures as described and one of these mechanisms is illustrated in Fig. 5. In Fig. 5, 28 designates a lamp housing of any suitable character and provided with the upper and lower lens boxes 29 and 30 having lenses therein of the usual character. Disposed in front of the lamp housing and spaced therefrom a suitable distance is the box or casing 31 containing the intermittent motion mechanism and having the lens housings 32 and 33, the lens housing 32 being disposed in alinement with the axial center of the housing 29 and the housing 33 being disposed in alinement with the axial center of the housing 30. The casing 31 is formed with the upper and lower film gates 34 and 35. The film 36 passes from a reel 37 across the film gate 34, then across the film gate 35 and thence to the rewind reel 38. A loop 39 is formed above the film gate 34 and a loop 40 is formed above the film gate 35 while a loop 41 is formed above the sprocket 42 which feeds the film to the rewind reel. A shutter 43 of the character heretofore indicated may be disposed immediately in advance of the lenses contained in the casings 32 and 33, or this shutter may be disposed between the film and the lenses contained in the casings 29 and 30. Colored screens 44 and 45 may be disposed between each gate 34 and 35 and the corresponding sets of projecting lenses, one of these screens being green and the other red as will more fully appear later.

In this form of the invention the lenses contained in the lens housings 32 and 33 are so arranged as to eliminate corresponding areas of the screen. Disposed within the lamp housing 28 are a pair of arc lights 46 and 47, one for each of the lens housings 29 and 30.

In Fig. 6 I show a form of projecting machine in which only one arc is used and one projecting lens. In this figure, 48 designates the lamp housing of the usual or ordinary type within which is supported the electric light carbons 49, these carbons intersecting each other at an angle and this intersecting point being disposed at the middle of the casing 48. Carried by the casing 48 are the upper and lower sets of lens 50 and 51. Each of these sets of lenses includes a lens 52 arranged at an angle to the axial center of the lens housing and adapted to receive light from the arc formed by the carbons 49 so as to project parallel beams of light through each of the lens systems 50 and 51. The two beams of light pass through film gates 53 and 54 formed in the casing 55 and each of these beams is projected against a prism 56 whence light passes at an angle through the stationary colored screens 57 and 58, one of which is red and the other green for instance, then through the prisms 59 to the projecting lenses 60 from whence it is projected out to the screen. A shutter 61 may be used. 62 designates the upper loop, 63 the second loop or intermediate loop and 64 the lower loop. Behind the gates 53 and 54 operates a suitable form of intermittent motion mechanism, the intermittent motion mechanism for one gate operating alternately to that for the other gate so that while one picture was being projected on the curtain through the gate 53, the next picture for projection would be coming in position opposite the gate 54 and while it was showing on the curtain the next picture would be coming in position at 53 again. There is never a period of time when there is no picture on the curtain. There is consequently no flicker. This form of projecting mechanism has several advantages over the form illustarted in Fig. 5 in that one lens is easier to adjust than are two and is, of course, cheaper in construction and one arc is cheaper and easier to keep in right condition than two would be. It will be obvious that except for the difference in the system of lenses and the use of one arc in place of two arcs, the mechanism illustrated in Fig. 6 operates on exactly the same principle as that illustrated in Fig. 5.

Figure 7:
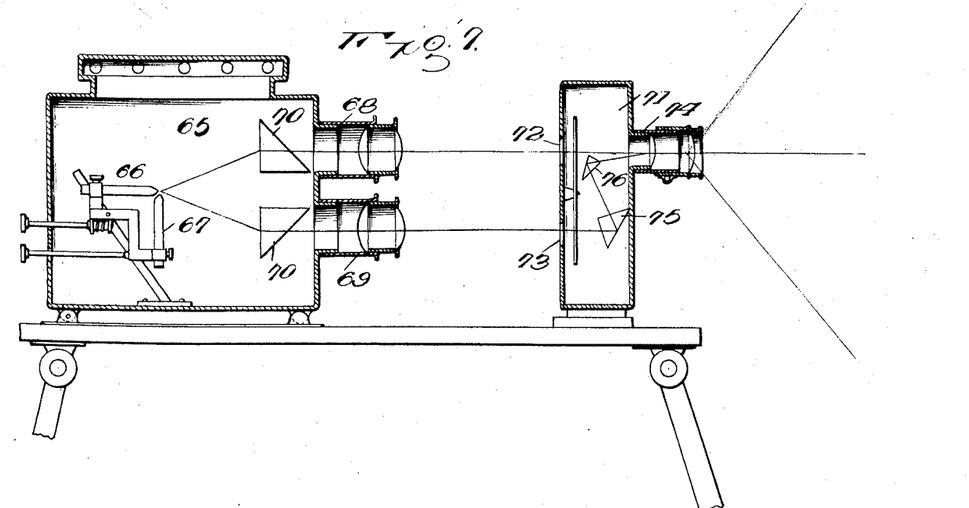
Fig. 7 is a vertical section through still another form.

In Fig. 7 I illustrate another form of projecting apparatus in which 65 designates the lamp house having therein the electric lamp designated generally 66 provided with carbons 67 which extend at right angles to each other. Two lens boxes 68 and 69 project from the lamp house and contain a system of lenses of any suitable character. Disposed within the lamp house are the triangular prisms 70 disposed one opposite each lens box 68 and so formed that they will both receive light from the lamp 66 and will deflect beams of light through the lens boxes 68 and 69. The moving picture apparatus is of the type as heretofore described and is disposed in rear of a casing 71 having two openings 72 and 73 through which the beams of light from the lens housings 68 and 69 are projected. The casing 71 has a lens housing 74 containing projecting lenses and also contains the prisms 75 and 76. The axis of the beam of light from the lens housing 68 passes directly through the opening 72 and directly through the lenses contained within the lens box 74. The beam of light from the lens box 69, however, is received upon the prism 75, from thence is transmitted to the prism 76 and from this prism through the lens box 74. The film loops are arranged precisely as in Figs. 5 and 6 and the mechanism for shifting the film is precisely the same as that previously described.

Figures 8, 15:
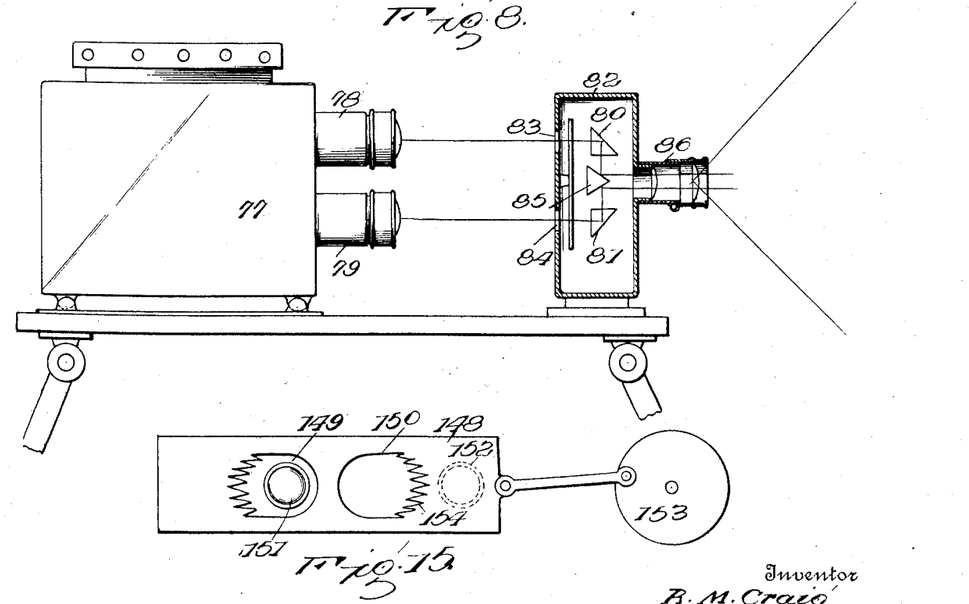
Fig. 8 is a similar section to Fig. 7 but showing a different projecting means.
Fig. 15 is a detail view of the shutter and the actuating mechanism therefor.

In Fig. 8 I show still another form of projecting apparatus in which two beams of light are projected from the lamp house and which are in turn projected through a single lens housing. In this figure, 77 designates a lamp house of any desired character and having therein either one or two lamps as may be desired. Beams of light are projected from the lamp housing through the lens housings 78 and 79 and these beams are received by the prisms 80 and 81 contained within the casing 82, there being two separate beams projected respectively through the openings 83 and 84. The prisms 80 and 81 deflect the beam toward the middle of the casing 82, the two beams being received upon a triangular prism 85 which deflects the light outward through the lens housing 86 containing any usual or desired system of lenses. In this figure also the usual film feeding mechanism is provided and the loops are arranged precisely as illustrated in Figs. 5 and 6.

Figure 9:
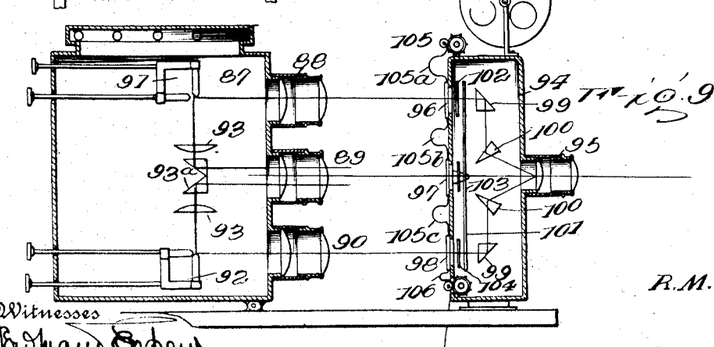
Fig. 9 is a vertical section through a machine for projecting natural color pictures.
Figure 19:
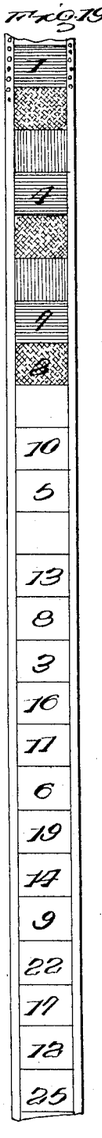
Figure 20:
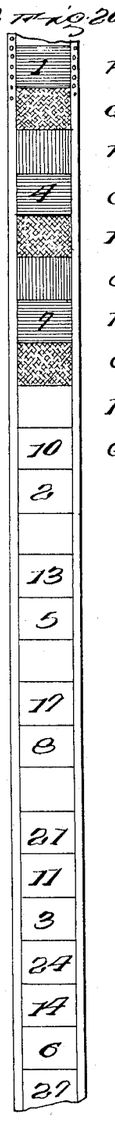

In Fig. 9 I illustrate a form of projecting machine adapted to be used for projecting moving pictures in colors. This is a three-color machine using a film as illustrated in Figs. 19 and 20 wherein yellow, blue and red color slides are used. This is a vertical machine, that is, the lens boxes are arranged in vertical series and the film passes vertically down past the several apertures or gates opening into the several boxes. In Fig. 9, 87 designates the lamp house having the three vertically arranged lens housings 88, 89 and 90, each containing the usual system of condensing lenses. Two electric lamps 91 and 92 are arranged within the lamp housing, these electric lamps being of that kind wherein the carbons are set at right angles to each other. The light from these lamps is received upon the lenses 93 and transferred to the prisms 93ᵃ from which the light is deflected at right angles and passes through the middle lens housing 89, the lens housings 88 and 90 receiving their light directly from the lamps 91 and 92. The casing 94 is shown as having a single lens housing 95 provided with proper projecting lenses and this casing 94 is formed with the three apertures 96, 97 and 98 disposed immediately opposite to the lens housings 88, 89 and 90.

The beam of light from the lenses contained in the housing 89 is projected directly through the lens housing 95. The beams from the lens housings 88 and 90 however pass through the respective apertures 96 and 98 and are received upon the prisms 99 whereby the light is deflected at right angles upon the prisms 100 which again deflect the light to the lenses contained in the lens housing 95 from which the beams are projected out upon the screen. It will be understood, however, that the light is first projected through the gate 96, then through the gate 97 and then through the gate 98 and so on. In order to cut off the passage of light intermittently through the several gates or apertures, I provide a shutter designated 101 which may be of any suitable construction.

Disposed between the aperture 96 and the corresponding lens 99 is a color slide or pane designated 102 and which may be blue in color. Disposed between the aperture 97 and the lens housing 95 is a pane or slide 103 which may be yellow in color while disposed between the gate 98 and the corresponding prism 99 is a slide or pane which may be red in color. It will be understood that these slides 102, 103 and 104 may be interchanged in position without altering their function, provided that the pictures on the film have been taken in the same order as the slides are arranged upon the machine.

The film 105 moves vertically downward past the several gates and is operated by the mechanism heretofore referred to, there being a separate feeding and loop forming mechanism at each gate. Thus the loop 105$^a$ is the loop for the gate 96; the loop 105$^b$ is the loop for the gate 97, and the loop 105$^c$ is the loop for the gate 98, the minor loop being designated 106.

While I have illustrated in this figure a projecting machine having one system of projecting lenses contained within the lens housing 95, I wish it understood that I might use three lens housings arranged opposite the three lens housings of the lamp box without in any way altering the operation of this mechanism, but of course doing away with the necessity of using the several prisms.

Figure 10:
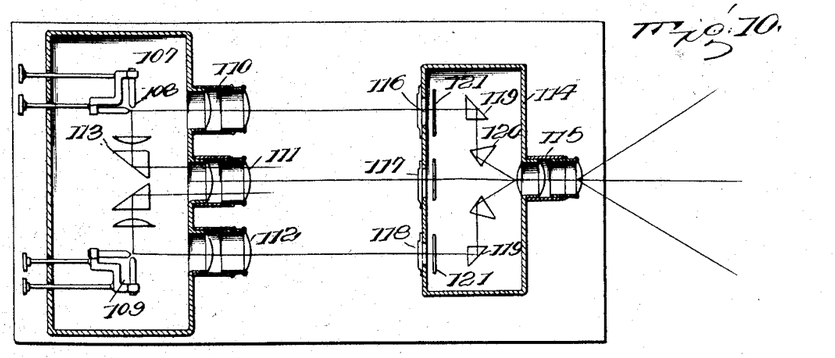
Fig. 10 is a horizontal section through a projecting apparatus designed for the projection of natural color pictures.
Figure 13:
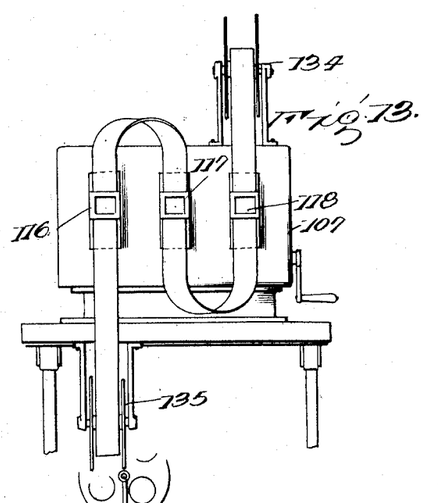
Fig. 13 is a rear elevation of the lens box or casing showing the film gates thereof and the manner in which the film is threaded in a machine having a horizontally arranged series of projecting lenses.
Figure 14:
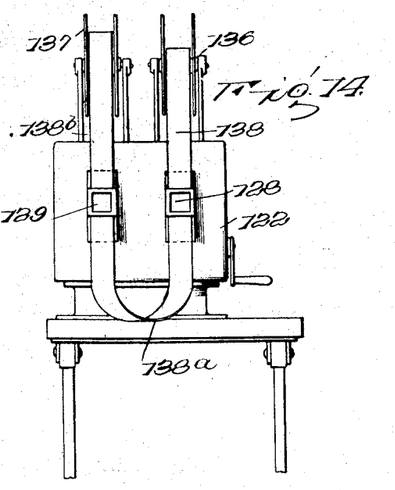
Fig. 14 is a like view to Fig. 13 but showing the manner of arranging the film where either of the projecting lenses is used as in the form of the machine illustrated in Fig. 11.

In Fig. 10 is shown a horizontal section of a horizontally arranged three-color machine, the loops and intermittent motion of this machine being arranged side by side in a manner illustrated in Fig. 14. Referring to Figs. 10 and 13, 107 designates a lamp house within which are disposed the lamps 108 and 109, these lamps being illustrated as electric lights arranged with their carbons at right angles to each other. The front of the lamp house is provided with three lens housings 110, 111 and 112. The lens housings 110 and 112 are arranged immediately opposite the lamps 107 and 108 respectively, while for the purpose of transmitting the light from the lamps I provide the lens system 113 such as described with reference to Fig. 9.

The casing 114 is provided at its middle with one set of projecting lenses contained within the lens housing 115 and is also formed with three gates or apertures 116, 117 and 118. The beam which passes through the aperture 117 passes directly through the lenses contained within the housing 115, while the beams which pass through the lenses contained in the housings 110 and 112 pass through the gates 116 and 118 respectively and are received upon the prisms 119 which permit the light to the prisms 120 from whence the light is transmitted to the projecting lenses. 121 designates the slips or panes of colored glass, one of these panes being red, another yellow and another blue as heretofore stated.

Figure 11:
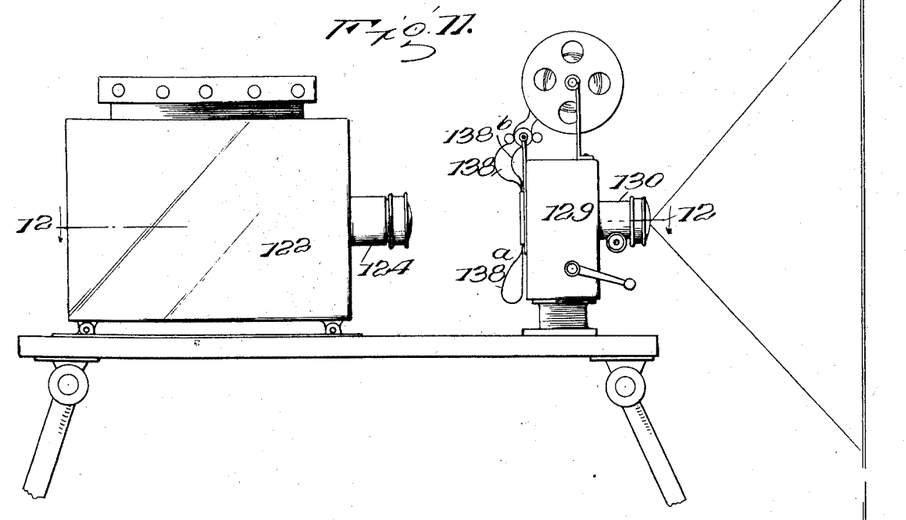
Fig. 11 is a side elevation of a projecting apparatus wherein the loops are arranged horizontally.
Figure 12:
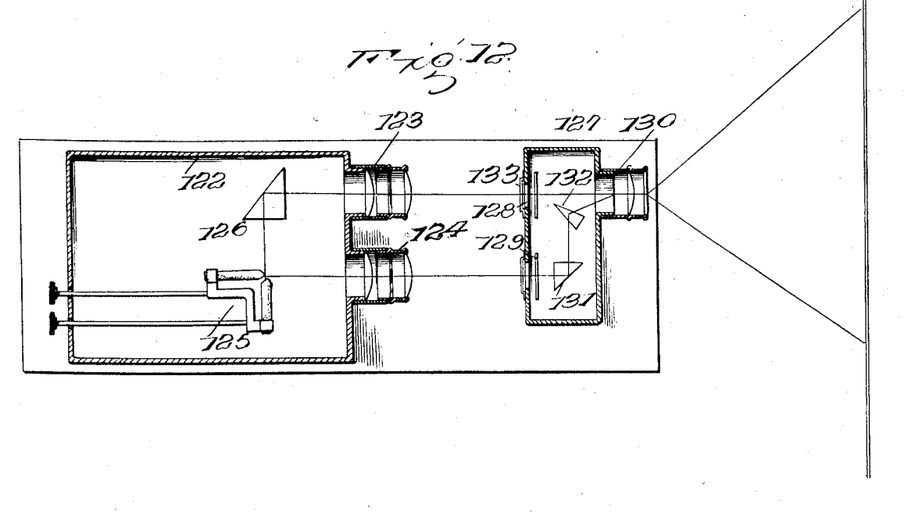
Fig. 12 is a horizontal section on the line 12—12 of Fig. 11.

In Figs. 11 and 12 is shown a two-color projecting mechanism wherein the lenses are horizontally arranged. In Figs. 11 and 12, 122 designates the lamp housing having the two lens housings 123 and 124, these lens housings being arranged in a horizontal plane. A single lamp 125 is illustrated as being disposed opposite the axial center of the lamp housing 124 and a beam of light is transmitted from this lamp through the lens housing 123 by means of a prism 126. The projecting apparatus includes the casing 127 having the two apertures 128 and 129 arranged also in a horizontal plane. The beam of light through the lens housing 123 passes directly through the aperture 128 and directly through a lens casing 130. The beam of light which passes through the lens housing 124 and aperture 129 is received upon a prism 131 from which it is transmitted to a prism 132 and from thence through the projecting lenses. In Figs. 11 and 12 green and red-color screens or slips of colored glass are used, these slips being disposed in front of the respective apertures 128 and 129 being designated 133.

In Fig. 13 is shown the manner in which the film is threaded for a projecting machine having a horizontally arranged series of apertures such as the machine illustrated in Fig. 10. The film is delivered from a reel 134 and moves downward past the first gate 118. It forms a loop below the gate 116 and passes upward past the gate 117. Then another loop is formed above the gate 118, the film then passing down past the gate 118 and being received upon the rewind reel 135.

In Fig. 14 is illustrated the manner in which the film is threaded having a two color machine such as that shown in Fig. 12. In this figure, 136 designates the reel from which the film is drawn. The film then passes down in front of the aperture 128, is looped will in practice be below this aperture, passes upward past the aperture 129 and is received upon the rewind reel 137. By reference to Fig. 11 it will be seen that the loop 138 is formed immediately above the aperture 128, the loop 138$^a$ is formed below the aperture 129 and that a subsidiary loop 138$^b$ is formed above the gate 129. In Fig. 13 there is a loop formed in front of each of the gates and a subsidiary loop formed between the gate 118 and the rewind reel 135.

It will be understood, of course, that each of the numbered spaces in Fig. 23 of the drawings bears a composite image. In other words, one half of each space will represent a photographic exposure through a red color screen and the other half of each space will represent a photographic exposure through a green color screen.

Figs. 17 and 18 illustrate films which are adapted to be used for the purpose of projecting colored pictures, the pictures being projected in two colors, red and green, these films being adapted to be used with the projecting apparatus shown in Fig. 5, provided the color screens 44 and 45 are used, one of these screens being red and the other green. It is of course obvious that the colored screens are so arranged that the pictures taken through a green colored screen shall be projected through the green colored screen of the projecting mechanism and the pictures taken through a red colored screen shall be projected through the red screen of the projecting machine. Thus each alternate picture is projected through a red and green colored screen respectively onto the curtain, and, since it is possible by my arrangement to dissolve one picture into another, or superimpose one portion of a picture onto the next, the colors are blended on the curtain direct for a given period.

Figs. 19 and 20 illustrate three-color films, Fig. 19 showing a film wherein consecutive pictures are spaced apart eight pictures, that is, that there are eight pictures to be disposed between each intermittent sprocket, the loop being included. Fig. 20 shows a like film to Fig. 4, but in this there are eleven picture spaces to be disposed between one intermittent sprocket and the next succeeding intermittent sprocket including the loop. These films are designed to be used with such a machine as that shown in Fig. 9 where the film is fed downward vertically past a vertical series of gates. If each individual color record is threaded in its corresponding proper gate for projecting the picture through the corresponding colored screen, each colored record or picture will be projected only through its particular gate and the color screen it is meant for. To illustrate, every third picture in Figs. 19 and 20 is spaced so as to have been taken through a red screen, and in threading the film this picture taken through the red screen is threaded in the gate for projecting the red colored picture, and since each intermittent sprocket after each exposure moves up three picture spaces, its next picture for use will still be a picture taken through the red screen.

Figures 21, 22:
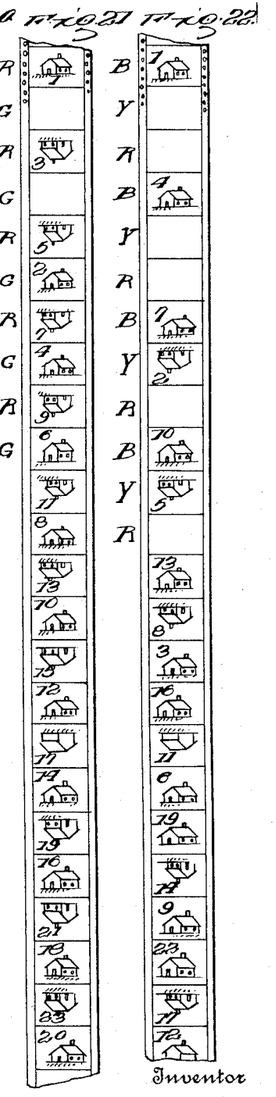

Fig. 21 illustrates a film having pictures thereon arranged for use with the form of projecting machine shown in Fig. 14. In this form of machine it will be seen that certain of the pictures must be taken upside down and certain other of the pictures must be taken and projected in their normal position. In such a machine the film runs down through one film gate, is reversed and runs upward through the second film gate, and in order to keep the picture in an upright position on the curtain, each alternate picture on the film must be printed in an opposite direction. In Fig. 21 the film is shown as arranged for projecting two-color pictures while in Fig. 22 the film is shown as arranged for projecting three-color pictures or three-color films. Furthermore, the film shown in Fig. 22 is adapted to be used with the projecting machine shown in Fig. 13 where every third picture must be taken and projected upside down.

In Fig. 23 is illustrated another form of color film adapted to be used in conjunction with my apparatus and projecting pictures on the same principle as heretofore described. In this film, however, the pictures on one lateral half of the film are alternately red and green. Pictures on the other half of the film are also alternately red and green, the green pictures on each half of the film being set in staggered relation to the green pictures on the other half of the film.

In Figs. 24 and 24ª are illustrated color screens for the upper and lower gates and adapted to be used with the form of film illustrated in Fig. 23. 140 designates the upper color screen and 141 the lower color screen. It will be seen that the upper color screen is half of green glass designated 142 and the other half of red glass designated 143, while in the lower color screen 141 the red and green sections of glass are reversed from the position shown in the screen 140.

In Fig. 4 there is illustrated a form of shutter which could be used in conjunction with my apparatus, this shutter controlling the passage of light through two film gates. The shutter has a circular frame designated generally 144 and also has the shutter segments 145 which are mounted upon the main body 146 of the shutter, these shutter segments being slotted as at 147 and pins passing through the main portion of the shutter and into these slots so as to permit the shutter segments to be adjusted nearer to or farther from each other and thus increase or decrease the time of exposure or occultation. The segments 145 are preferably serrated on their edges so that one picture will dissolve into the next.

In Fig. 15 I show a reciprocating shutter designated 148 which is provided with two apertures 149 and 150, the aperture 149 controlling the passage of light from the gate or lens 151, while the aperture 150 controls the passage of light from the gate or lens 152. The shutter is reciprocated in any suitable manner as by means of the crank wheel 153. It will be noted that the edges of the apertures 149 and 150 are serrated as at 154. For the three-color process a suitable shutter would be provided so as to permit the passage of beams of light through the several gates in predetermined successive order.

In Fig. 3 is illustrated one of the many intermittent motions commonly used on moving picture machines for intermittently shifting a section of film past the gate. In this figure, 155 designates the driving wheel provided with the outwardly projecting pin 156 and with the circular interrupted flange 157. Mounted upon a shaft 158 is a Geneva cross 159 with which the pin 156 engages upon each complete rotation of the wheel 155 and by which it is rotated through a quarter of a revolution, the Geneva cross being then prevented from any further movement by the flange 157.

Mounted upon the shaft 158 is the gear wheel 160 whereby motion is transmitted to a shaft 161 carrying a sprocket wheel 162 which actuates the film.

It will be understood that the particular features illustrated in Fig. 3 form no part of my invention and I have merely illustrated this construction so as to make it plain that I may use this form of intermittent motion as well as the form illustrated in Fig. 2.

In Fig. 25 is illustrated a semitransparent screen disposed within a shutter. During the brief interval when the light from two beams is on the curtain, there is a tendency to create a slight flicker by the rise and fall in illumination due to the change in intensity from two beams of light to one. The object of this device is to overcome this tendency to flicker. It comprises a frame 163. In this figure, 163 designates the circular frame of the shutter and 164 the axis thereof. 165 designates the opaque portion of the shutter provided with the serrated edges 166, and 167 designates the semitransparent screens disposed in the shutter. This screen would be sufficiently opaque to cut the two beams of light down to a point where they would be the equivalent of only one beam. Preferably and in order to secure a proper dissolving effect where toothed or ragged edged shutters are used, the serrations or teeth on one segment or edge of the shutter are arranged in staggered relation to the teeth on the other edge or segment of the shutter, the distance from the center of each individual tooth being displaced the width of one tooth on one side which holds the light from one side dovetailed as it were into the other side from passing through two beams.

It will be understood that the shutter which conceals one loop while the other is showing may be so constructed that at the exact instant one picture disappears from the screen, the next takes its place thereon, or that they may be so constructed that one picture can be made to overlie or overlap another for as much as one-quarter of a period. The shutter should be serrated on the edges so that one picture will dissolve into the other and by the use of the shutter illustrated in Fig. 4 the shutter could be so arranged that the pictures would not overlap at all, or so that one picture could be superimposed or overlie another one anywhere from a minimum amount to one-quarter the given period, thus softening the effect and blending one action harmoniously into the next, making the picture more real and natural on account of the picture about to pass away overlapping the one just presented for the first eighth of this period. The shutters used may be either of a revolving type or of a reciprocating type or of any other improved type just so that the apertures for the two or three beams of light are alternately closed at the proper instant.

The position of the shutter is more or less optional. The shutters may be placed in the paths of the separate beams of light before these beams reach the film, or may be placed so as to cut the beams of light just after they have passed through the film, or they may be used after the beam or beams have passed through the projecting lenses.

It will of course be noted that the method of taking and projecting color pictures is based upon the Urban-Smith process in which the pictures are taken alternately through the red and the green screens of a revolving sector. The pictures are reproduced afterward by projecting the corresponding pictures through the red and the green screens of a revolving color sector. In this method, however, it is necessary to run the pictures twice as fast or project them twice as fast as in the ordinary motion pictures, that is, to project thirty to thirty-two pictures during a second instead of only sixteen. This is rendered necessary by the fact that the reds and greens are projected separately on the screen and are blended together by the eye through the rapidity with which the film is run and because of persistence of vision.

In my arrangement for taking and projecting color pictures, I am able to insert a stationary transparent red color screen and a stationary transparent green color screen, each in one or the other of the two beams of light, each alternate picture being projected through a red and a green color screen respectively onto the curtain, but since in my system it is possible to dissolve one picture into another or superimpose one portion of a picture upon the next, the colors are blended on the curtain direct for a given period. There would be a brief period when there would be only one color picture on the curtain but the superimposing of two colors would alternate and follow sufficiently rapidly as to comply with the requirements of persistence of vision, thus reproducing animated pictures apparently in their natural colors. By the use of my method of arranging the picture spaces on the film and by the use of the mechanism here disclosed, a color picture can be produced on a little over half the film required by the present methods such as the methods of Urban-Smith. This does away with the complications arising with the high speed machinery necessary to project the pictures, and at the same time eliminates all flicker. In the present method of projecting color pictures, should the machine be threaded so that the proper spaces do not match or harmonize with the direct color filters at the right instant, it is more or less difficult to adjust the machine or else the machine has to be rethreaded. In my system should the machine be threaded wrongly with regard to the transparent color screens, all that is necessary is to transpose the transparent color screens or filters and they will then harmonize with the corresponding records of color spaces on the film.

Regarding the photographic process whereby the films are produced; in the two color method a transparent red screen or filter would be placed in front of one lens of the camera illustrated in Fig. 1 or behind this lens, and a green screen would be inserted in the path of the light passing through the other lens, the red rays making their record on every alternate space and the green rays making their corresponding record on the remaining alternate spaces. For the negative a film sensitized with a panchromatic emulsion is used which is sensitive to light colors. The positive is printed from this on ordinary stock films. The diapositive copy made from this negative thus obtained will be transparent at points corresponding to the red portions of the original object and will be more or less darkened in other parts, and if viewed through a red screen will show high lights of bright red where the object was red and at intermediate points the red will be more or less cut off. This is true also of the green.

I do not want to be limited to the use of two loops and their corresponding intermittent sprockets for as heretofore described I may just as easily use three or more loops. Three loops with three gates and projecting lenses would be particularly valuable in the reproduction of natural color photographs for scientific purposes. In this case the transparent color screen would be red, yellow and blue. While all of one certain color was on the screen, each of the other colors would overlap for a given period and the various colors would alternate with such rapidity that a very perfect reproduction of natural colors is possible at a little more than normal speed.

What I claim is:

1. A moving picture machine having film gates arranged in the same horizontal plane, means for projecting light through the film gates, means for feeding a film vertically downward past one film gate and vertically upward past another film gate, said film having series of pictures thereon, one series for each of said film gates, one series of pictures being upside down with relation to another series of pictures, the shifting means for operating to move the film to bring one series of pictures successively before a corresponding film gate alternately to the series of pictures presented before the other film gate.

2. A machine for reproducing moving pictures having three film gates arranged in a horizontal line, means for feeding a film downward past one film gate, upward past the other film gate and downward past the next succeeding gate, said film having thereon three series of pictures, one for each of the film gates, every third picture on the film being arranged upside down with relation to the other pictures, means for presenting each series of pictures before a corresponding film gate, means for alternately forming a film loop in advance of each film gate and shifting the film before each film gate, and means for successively cutting off the passage of light through each film gate during the time that the film is moving past said film gate.

3. In a moving picture machine, a revolving shutter having an opaque portion, the opposite edges of the opaque portion being serrated, the serrations of one edge having staggered relation to the serrations of the other edge.

In testimony whereof I affix my signature in presence of two witnesses.

RICHARD M. CRAIG. [L. S.]

Witnesses:
BASCOM BELL,
J. M. KNIGHT.